(12) United States Patent
Reeve

(10) Patent No.: US 8,104,294 B2
(45) Date of Patent: Jan. 31, 2012

(54) INTEGRATED THERMO-ELECTRIC HEAT PUMP SYSTEM FOR VEHICLE PASSENGER TEMPERATURE CONTROL

(75) Inventor: Hayden M. Reeve, Hartford, CT (US)

(73) Assignee: Carrier Corporation, Farmington, CT (US)

( * ) Notice: Subject to any disclaimer, the term of this patent is extended or adjusted under 35 U.S.C. 154(b) by 1071 days.

(21) Appl. No.: 11/922,049

(22) PCT Filed: Jun. 24, 2005

(86) PCT No.: PCT/US2005/022375
§ 371 (c)(1),
(2), (4) Date: Dec. 12, 2007

(87) PCT Pub. No.: WO2007/001289
PCT Pub. Date: Jan. 4, 2007

(65) Prior Publication Data
US 2009/0288816 A1 Nov. 26, 2009

(51) Int. Cl.
*F25B 21/02* (2006.01)
(52) U.S. Cl. ............... 62/3.2; 62/3.3; 62/244
(58) Field of Classification Search ............ 62/3.1, 62/3.2, 3.3, 3.6, 3.61, 244, 160, 238.7, 324.1; 136/203, 204; 165/42, 43, 202
See application file for complete search history.

(56) References Cited

U.S. PATENT DOCUMENTS

| 6,272,873 | B1 | 8/2001 | Bass | 62/238.3 |
| 7,380,586 | B2* | 6/2008 | Gawthrop | 165/202 |
| 2006/0130490 | A1* | 6/2006 | Petrovski | 62/3.3 |

FOREIGN PATENT DOCUMENTS

CN 2532433 Y 1/2003

OTHER PUBLICATIONS

International Search Report issued Nov. 5, 2007 by the ISA/US for the corresponding PCT application PCT/US2005/022375.
English Translation of Chinese Office Action for Chinese Patent Application No. 200580051299.2 issuing date of Apr. 7, 2011.
Xiao Youming et al., "A Study on Heat Transfer in a Waste Heat Absorption Refrigeration System for Automotive Air Conditioning", Automotive Engineering, 2004, pp. 17-20, vol. 26, No. 4, China Academic Journal Electronic Publishing House. China (with English Abstract).

\* cited by examiner

*Primary Examiner* — Mohammad Ali
(74) *Attorney, Agent, or Firm* — Cantor Colburn LLP

(57) ABSTRACT

A system for controlling the temperature of a passenger cabin has a tube for receiving a heat transfer fluid from an engine and a number of heating coils being thermally connected to the tube. The system also has a number of thermo-electric heat pumps connected to the tube. The heat transfer fluid is modulated for controlling the temperature of the passenger cabin at a number of different points of the passenger cabin.

12 Claims, 5 Drawing Sheets

INTEGRATED THERMO-ELECTRIC HEAT PUMP SYSTEM FOR VEHICLE PASSENGER TEMPERATURE CONTROL

BACKGROUND OF THE INVENTION

1. Field of the Invention

The present invention relates to a temperature controlled environment for a passenger cabin for a vehicle. More particularly, the present invention relates to a temperature controlled passenger cabin environment that has a number of thermo-electric heat pumps for providing additional heating to the passenger cabin (for when waste heat from the engine is insufficient) and/or cooling the passenger cabin.

2. Description of the Related Art

Temperature control systems are known in the art for passenger cabins. Such known systems use a vapor compression cycle to provide cooling. A compressor is connected to an engine and circulates refrigerant that feeds a condenser. The condensed refrigerant is then throttled and used to provide cooling to the driver and at an evaporator in the main cabin.

For buses, engine waste heat is transferred to a fluid and circulated around the passenger cabin to provide heating. Furthermore, when desired additional heaters may be provided. Such heaters are, in some instances, a diesel fired auxiliary heater. This auxiliary heater and waste heat generated by the engine warm the passenger compartment.

However, these two systems are costly to install and are bulky. This bulk increases the overall weight of the vehicle. The increase in weight also tends to lessen the fuel economy of the vehicle. Moreover, such systems may heat the passenger cabin unevenly thus causing discomfort to some because the passenger cabin is too hot, not hot enough or too cold at certain areas.

Further, the vapor compression cycle uses a refrigerant. Such refrigerants are costly and also are very disfavored. Some refrigerants are well known and are very harmful to the environment and require increased service costs for safe removal from the vapor compression cycle, and for replacement.

Accordingly, there is a need for a cooling system for a passenger cabin that does not use any refrigerant, and does not have any vapor compression cycle. There is also a need for a temperature control system for a passenger cabin that does not use any additional heating device. There is still another need for a system for a passenger cabin that modulates the temperature at a number of preselected points in the passenger cabin for a more comfortable operation.

There is also a need for such a system that eliminates one or more of the aforementioned drawbacks and deficiencies of the prior art.

SUMMARY OF THE INVENTION

It is an object of the present invention to provide a system for controlling the temperature of a cabin that eliminates a vapor compression cycle.

It is another object of the present invention to provide a system for controlling the temperature of a cabin that eliminates an auxiliary heater.

It is yet another object of the present invention to provide a system that integrates a heating system and a cooling system into one system.

It is still another object of the present invention to provide a system that has a distribution feature to allow for a localized heating and a localized cooling in a cabin.

It is still yet another object of the present invention to provide a system for controlling a temperature of a cabin that uses electricity as a primary form of power.

It is a further object of the present invention to provide a system for cooling and heating a passenger compartment that eliminates green house gases entirely and is beneficial to the environment.

These and other objects and advantages of the present invention are achieved by a system of the present invention. The system is for controlling the temperature of a passenger cabin and has a tube for receiving a heat transfer fluid from an engine. The system also has heating coils thermally connected to the tube and a number of thermo-electric heat pumps connected to the tube. The heat transfer fluid is modulated for controlling the temperature of the passenger cabin at a number of different points of the passenger cabin.

DETAILED DESCRIPTION OF THE INVENTION

Figure 1:
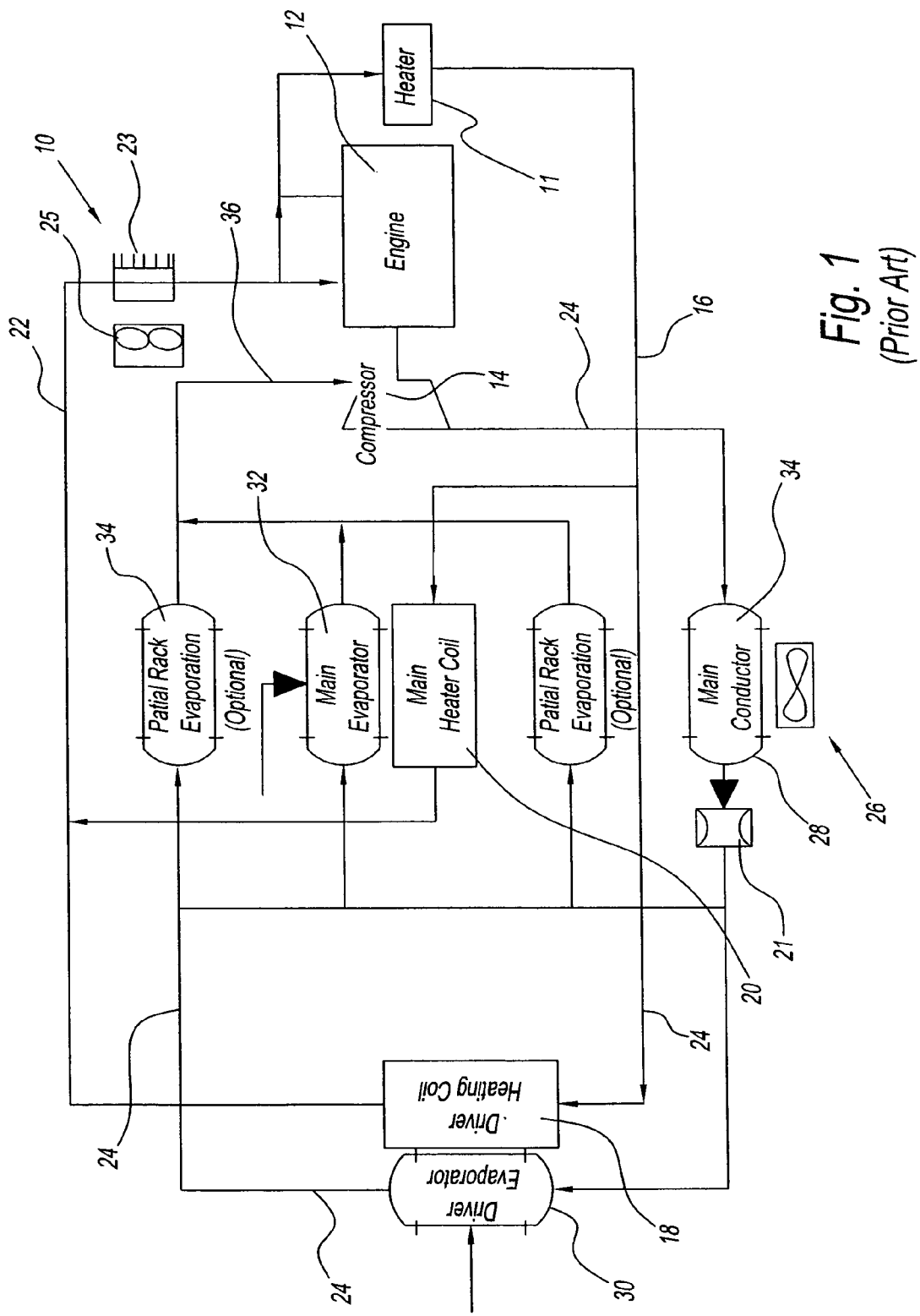
FIG. 1 is a schematic of an existing prior art heating and cooling system for a vehicle.

Referring to the figures and in particular FIG. 1, there is shown a system 10 of the prior art of an existing heating and cooling system for a vehicle. The vehicle has an engine 12. The engine 12 preferably powers a compressor 14. The system 10 preferably has a first heating loop 16 of engine coolant. As is understood in the art, the engine coolant in the first heating loop 16 traverses through a conduit for allowing heat to transfer through the conduit to a desired area of the vehicle such as a car, bus, tractor, truck, hybrid vehicle, electrical vehicle, fuel-cell vehicle, aircraft, helicopter, or any other device using or having a combustion engine. The first heating loop 16 is from the engine 12 to an auxiliary heater 11 to a driver heating coil 18. The engine 12 is further thermally connected to a main heating coil 20. The main heating coil 20 heats a passenger or storage compartment and is further connected to a return line 22 to the engine 12. Should passenger cabin heating not be required the fluid in the line 22 is preferably connected to a heat exchanger (radiator) 23 and fan 25 such that engine waste heat can be transferred to the ambient before the fluid is returned to the engine 12. This first heating loop 16 preferably heats both a driver of the vehicle and a passenger cabin, or alternatively whatever contents the vehicle carries such as packages, produce or livestock.

The prior art system 10 also has a second cooling loop 24 with another heavy and bulky second system or a cooling system generally represented by reference numeral 26. The second cooling system 26 flows a refrigerant through the second cooling loop 24. The second cooling loop 24 is connected to and has the compressor 14. The compressor 14 is connected to a main condenser 28 that is further connected to a throttling orifice 21, to a driver evaporator 30, a main evaporator 32 and an optional parcel rack evaporator 34. Fresh ambient air is introduced to the driver evaporator 30, and the main evaporator 32 and the second cooling loop 24 then is connected to a return line 36 back to the compressor 14. This system 10 is well known in the prior art and very disfavored because of the refrigerant in the second cooling loop 34 is harmful to the environment, and costly to replace. The system 10 also increases costs because it is costly to install and heavy to transport.

Figure 2:
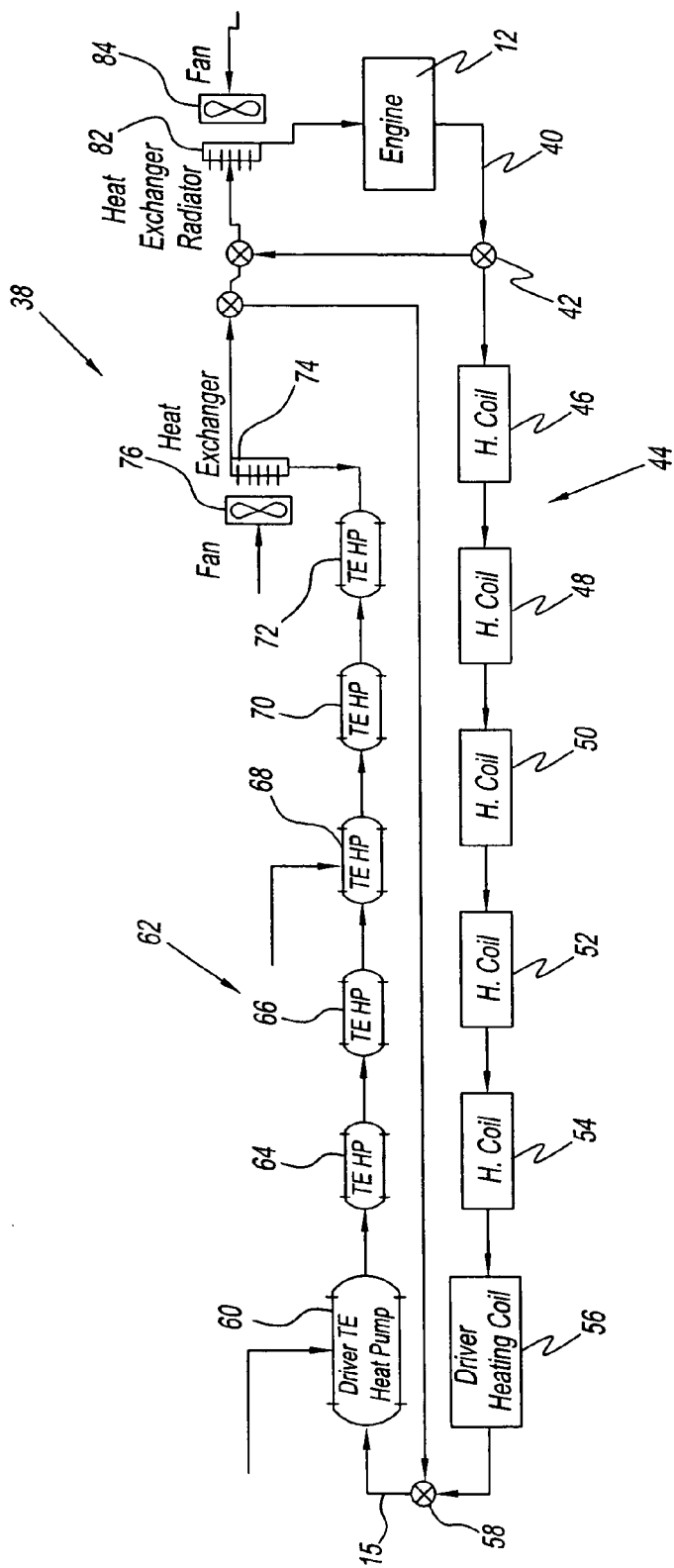
FIG. 2 is a schematic of the integrated distributed thermo-electric system of the present invention showing a heating mode.

Referring now to FIG. 2, there is shown a schematic of a preferred embodiment of the system 38 of the present invention. The system 38 of the present invention overcomes these known problems in the art and is preferably used in a bus, truck, or any other vehicle in the art using an internal combustion, electric, fuel cell or hybrid engine. In this embodiment, the system 38 is in a heating mode and may be switched either automatically or manually from the heating mode to a cooling mode. In the heating mode, the system 38 of the present invention preferably allows for superior operation because it provides a passenger or storage cabin with a number of different localized heating areas, or a uniformly heated space in the passenger cabin or storage cabin. The system 38 preferably has the engine 12 and uses the waste heat generated therefrom.

The engine 12 when operating generates a great amount of waste heat. The system 38 preferably has a tube 40 being connected to the engine 12 with a heated fluid being disposed therein and flows in a first heating loop 15. In one embodiment, the heated fluid is a radiator fluid. However, alternatively, the heated fluid may be any environmentally friendly fluid in the art that can absorb and retain thermal waste energy. The heated fluid absorbs, retains and communicates the waste heat from the engine 12 to the passenger compartment. The heated fluid is connected to a first valve 42 and then when the first valve is opened enters the passenger cabin. The tube 40 is further connected to a number of heating coils 44. The heating coils 44, although shown as a first heating coil 46, a second heating coil 48, a third heating coil 50, a fourth heating coil 52 and a fifth heating coil 54 may be any number of heating coils and is not limited to this depicted arrangement and the system 38 may have one or any number of heating coils 44 complementary to a geometry of the space to be heated in the passenger cabin. Moreover, the heating coils 44 may be any structures known in the art that can dissipate the thermal energy from the heated fluid in the tube 40 to the passenger cabin in a safe manner. The heating coils 44 may not be coiled shaped and may have any configuration known in the art (and may be any number in the art preferably to transfer waste heat in an effective manner from the heated fluid to the passenger cabin). The tube 40 is then connected to a driver heating coil 56. The driver heating coil 56 simply may have the same or a different configuration and is in a complementary location of the driver of the vehicle.

In the heating mode, the tube 40 of the system 38 is then connected to a second valve 58. If the engine waste heat transferred in tube 40 is sufficient to heat the passenger cabin valve 58 can be set such that the thermo-electric heat pumps 60, 62 are bypassed and the fluid is returned to the heat exchanger (radiator) 82. In this case the heat exchanger (radiator) 82 with a fan 84 transfers excess engine waste heat to the ambient environment. Should additional passenger cabin heating be desired the second valve 58 is then connected to a driver thermo-electric heat pump 60 and then a number of thermo-electric heat pumps 62. The driver thermo-electric heat pump 60 and then a number of thermo-electric heat pumps 62 are connected to an electric power source (not shown) and receive direct or alternating electric current. The number of thermo-electric heat pumps 62, although shown as a first through fifth thermo-electric heat pumps 64, 66, 68, 70, and 72 is not limited to this arrangement and can vary depending on the desired geometry. The number of thermo-electric heat pumps 62 may be placed in a compartment in spaced relation over the passengers in a bus coach configuration and each also preferably has a manual control or dial to permit the passenger to actuate each of the number of thermo-electric heat pumps 62. In one embodiment, the system 38 has the driver thermo-electric heat pump 60 and then the number of thermo-electric heat pumps 62 actively transferring heat from the heat transfer fluid in the tube 40 to the passenger cabin prior to the fluid entering the engine 12 to pick up more waste heat. Preferably, the heated fluid in the tube 40 is connected to a heat exchanger (radiator) 74 and fan 76 and is returned to the engine 12 to pick up more waste heat and thus re-circulate through the tube 40.

Figure 3:
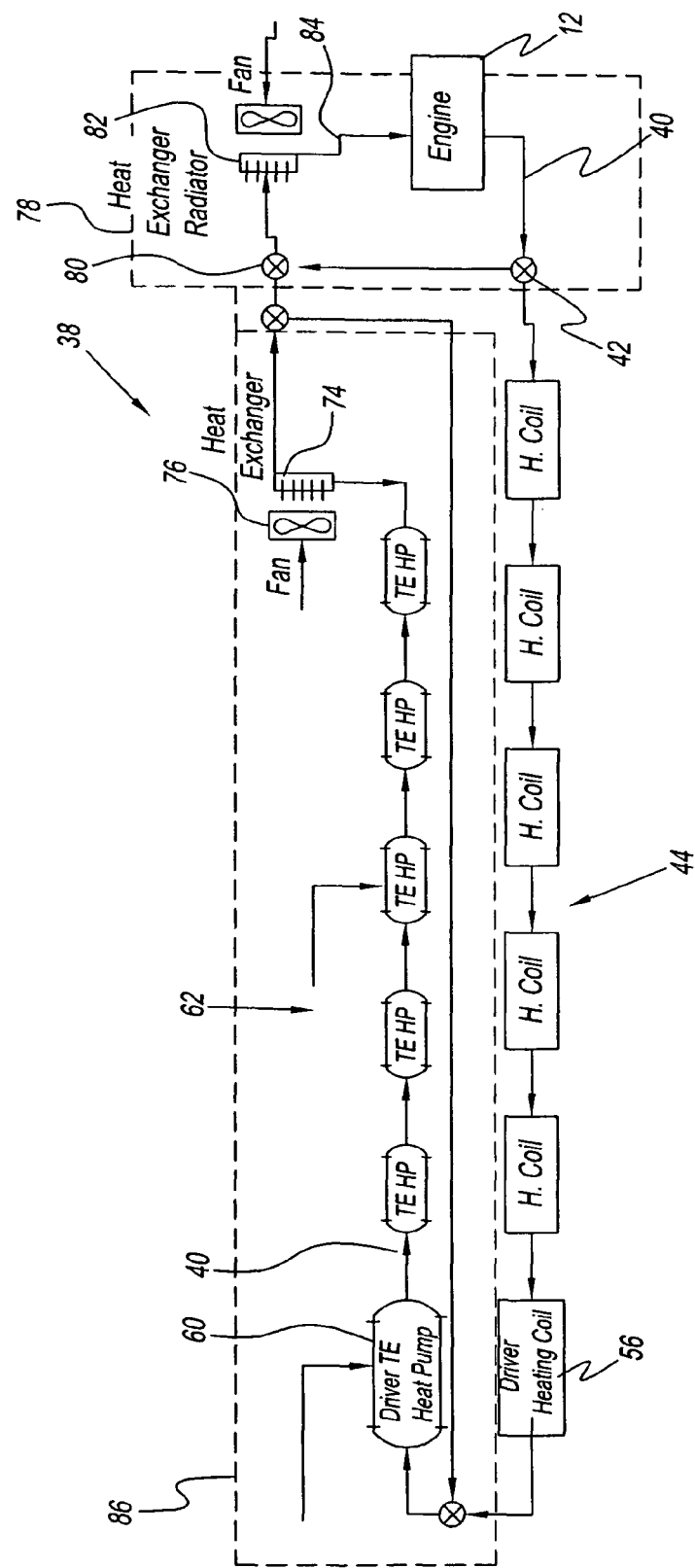
FIG. 3 is a schematic of the integrated distributed thermo-electric system of the present invention in a cooling mode.

Referring now to FIG. 3, on hot days when the temperature outside the vehicle rises, the system 38 is superior because it has a cooling mode without any environmentally unfriendly refrigerant. In the cooling mode, the first valve 42 does not allow the heated fluid in the tube 40 from the engine 12 to communicate with the number of heating coils 42 and instead enters a return loop back into the engine as generally represented by reference box number 78. The return loop 78 then preferably communicates with a third valve 80 and that is connected to a heat exchanger 82 and then returned to the engine 14. Preferably in the return loop 78, there is a fan 84 to blow air on the heat exchanger 82 as is known in the art.

The number of thermo-electric heat pumps 62 preferably in this mode, provide cooling to the passenger cabin by transferring heat from the cabin to the heat transfer fluid in the tube 40 and then dumping that heat to the ambient using the heat exchanger 74 and the fan 76. The number of thermo-electric heat pumps 62 preferably in this mode, preferably mimic a role of the evaporator in the vapor compression cycle. The heat transfer fluid is re-circulated in the cooling loop generally designated by reference number 86 by a pump (not shown). Moreover, the passenger has a greater control over the system 38 as one or more of the number of thermo-electric heat pumps 62 may be manually or automatically switched off so as to not receive current and thereby increase the temperature only at a localized region of the passenger compartment. One skilled in the art will appreciate that each of the number of thermo-electric heat pumps 62 or the driver thermo-electric heat pumps 60 may have a dial or control that may modulate of the electric current to each thermo-electric heat pump. Thus, a passenger at a preselected point may selectively modulate the current to provide for increased heating or cooling.

Figure 4:
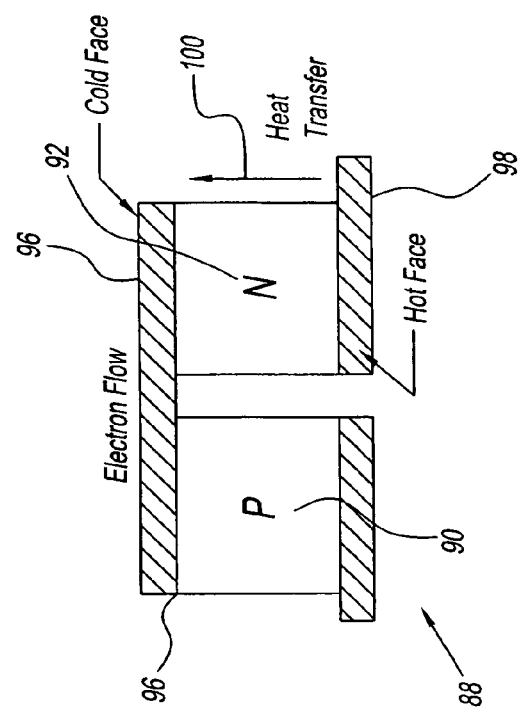
FIG. 4 is a view of a thermo-electric heat pump of the present invention of FIGS. 2 and 3.

Referring to FIG. 4, there is shown a cross sectional view of a thermo-electric heat pump shown as reference numeral 88. The thermo-electric heat pump 88 is preferably a solid state device and has a first positively doped semiconductor 90 and a second negatively doped semiconductor 92 as is known in the art. Current from the power supply is passed through the first positively doped semiconductor 90 to the second negatively doped semiconductor 92. When current is passed therethrough as indicated by reference arrow 94, heat is transferred through the thermo-electric heat pump 88 from a first hot face 98 to a second cold face 96 of the thermo-electric heat pump as indicated by arrow 100. Referring again now to FIG. 3, the number of thermo-electric heat pumps 62 collectively pull the heat from the passenger cabin to the heat exchanger 74 (via the heat transfer fluid) where the heat is transferred to ambient outside of the passenger cabin by the fan 76 to allow for a more comfortable passenger cabin.

Figure 5:
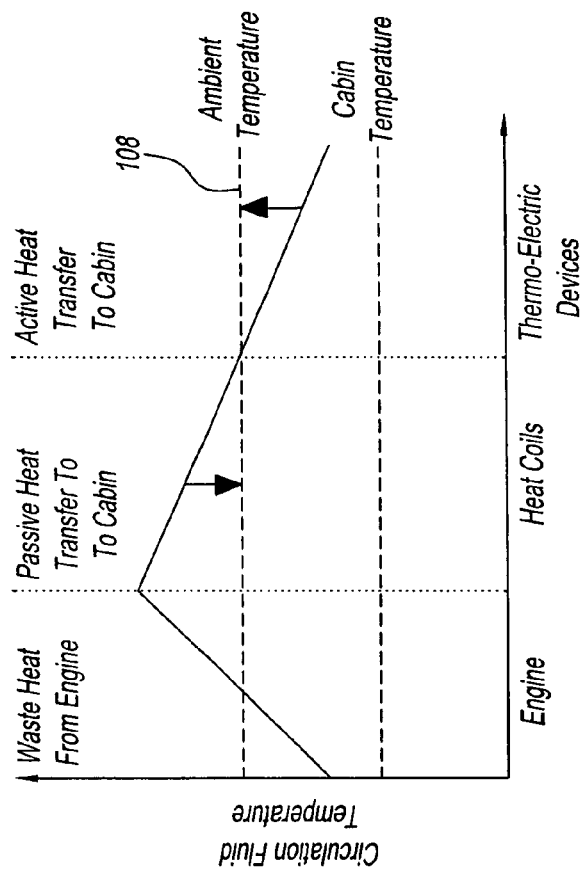
FIG. 5 is a graph of the change in temperature of a heat transfer fluid at a number of various zones in the system in the heating mode.
Figure 6:
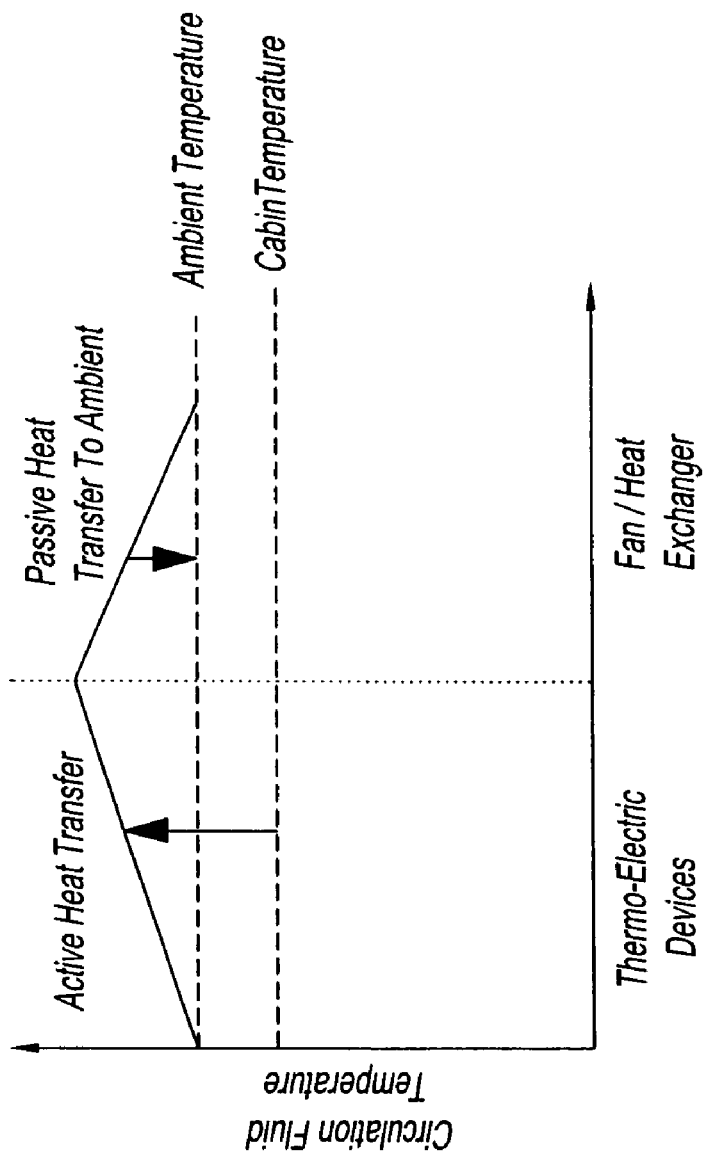
FIG. 6 is a graph of the change in temperature of a heat transfer fluid at a number of various zones in the system in the cooling mode.

Referring now to FIGS. 5 and 6, there are shown schematics of the temperature of the heat transfer fluid over a number of zones of the passenger cabin. As shown in FIG. 5 the zones being the engine zone 102, the heating coil zone 104 and the thermo-electric device zone 106. As can be understood from FIG. 5 the fluid temperature is greatest at the entrance of the heated fluid into the heating coils zone 104 then heat is transferred passively to the passenger cabin and the heat transfer fluid's temperature decreases and approaches the desired cabin temperature as indicated by reference numeral 108. Should additional heating of the cabin be desired the thermo-electric device zone 106 could actively transfer heat from the colder transfer fluid to the warmer cabin. As can be understood from FIG. 6, in the cooling mode the thermoelectric devices zone 110 actively transfers heat from the cabin to the transfer fluid, which may be at a higher temperature than the passenger cabin. The transfer fluid then expels this heat to the ambient environment in the fan heat exchanger zone 112, thereby decreasing the transfer fluid's temperature.

Preferably, the system 38 may be manually controlled from the heating mode to the cooling mode or alternatively be controlled by a sensor (not shown). The system 38 further has a number of unexpected benefits such as the system eliminates a vapor compression cycle working refrigerant fluid that is very harmful to the environment. The system also has the unexpected superior benefits of an integration of two prior art heating and cooling systems into one compact energy efficient system. The system 38 of the present invention removes a vapor-compression cycle and an auxiliary heater and thus reduces an overall weight of system.

The system 38 could allow localized control of heating and cooling for passenger comfort. The system 38 also uses electrically powered thermo-electric heat pumps 62 that are very complementary for fuel cell buses which will produce electricity as the primary form of power.

It should be understood that the foregoing description is only illustrative of the present invention. Various alternatives and modifications can be devised by those skilled in the art without departing from the invention. Accordingly, the present invention is intended to embrace all such alternatives, modifications and variances.

What is claimed is:

1. A system for controlling a temperature of a passenger cabin, the system comprising:
    a tube for receiving a heat transfer fluid from an engine;
    a plurality of heating coils being thermally connected to said tube, the plurality of heating coils being positioned at a plurality of preselected points complementary to a geometry of a space to be heated in the passenger cabin; and
    a plurality of thermo-electric heat pumps being connected to said tube, the plurality of thermo-electric heat pumps being positioned at a plurality of reselected points complementary to the geometry of the space to be heated in the passenger cabin, wherein said heat transfer fluid is modulated for controlling the temperature of the passenger cabin at a plurality of different points of the passenger cabin;
    wherein the system comprises a heating cycle and a cooling cycle;
    wherein in said cooling cycle, heat is drawn from the passenger cabin to a second heat transfer fluid at a first point by applying electrical power to said plurality of thermo-electric heat pumps, and wherein said second heat transfer fluid expels said heat to ambient at a second point.

2. The system of claim 1, wherein the system senses a temperature condition of the passenger cabin, and wherein said heat transfer fluid is modulated for controlling the temperature of the passenger cabin based in part on said temperature condition.

3. The system of claim 1, wherein in said heating cycle, said heat transfer fluid transfers heat to said cabin.

4. The system of claim 1, wherein said plurality of thermo-electric heat pumps are each electrically powered.

5. The system of claim 4, wherein each of said plurality of thermo-electric heat pumps are selectively modulated to receive a predetermined amount of current.

6. A system for controlling a temperature of a passenger cabin in a vehicle having an engine, the system comprising:
    a tube for receiving a heat transfer fluid from an engine, said tube forming a first loop, and a second loop;
    a plurality of heating coils being thermally connected to said tube, the plurality of heating coils being positioned at a plurality of preselected points complementary to a geometry of a space to be heated in the passenger cabin; and
    a plurality of thermo-electric heat pumps being connected to said tube, the plurality of thermo-electric heat pumps being positioned at a plurality of preselected points complementary to the geometry of the space to be heated in the passenger cabin, wherein said heat transfer fluid is controlled for controlling the temperature of the passenger cabin at a plurality of different points of the passenger cabin, wherein in said first loop said heat transfer fluid transfers heat from the engine to said plurality of heating coils in the passenger cabin, and wherein in said second loop said plurality of thermo-electric heat pumps receive electrical power to draw heat from the passenger cabin into a second heat transfer fluid being in said second loop, said drawn heat being expelled to ambient out of the passenger cabin.

7. The system of claim 6, wherein the system is retrofit to the vehicle.

8. The system of claim 6, wherein said thermo-electric heat pumps are disposed at a plurality of different locations in the passenger cabin, said plurality of different locations being complementary to a plurality of locations of passengers.

9. The system of claim 6, wherein each of said plurality of thermo-electric heat pumps are selectively controlled to receive a predetermined amount of current.

10. A system for controlling a temperature of a passenger cabin in a vehicle having an engine, the system comprising:
    a tube for receiving a heat transfer fluid from an engine, said tube forming a first passenger cabin loop, and a second closed loop, said second closed loop returning to the engine;
    a plurality of heating coils being thermally connected to said first passenger cabin loop, the plurality of heating coils being positioned at a plurality of preselected points complementary r of a space to be heated in the passenger cabin; and
    a plurality of thermo-electric heat pumps being connected to a third loop, the plurality of thermo-electric heat pumps being positioned at a plurality of preselected points complementary to the geometry of the space to be heated in the passenger cabin, wherein said heat transfer fluid is modulated for controlling the temperature of the passenger cabin at a plurality of different points of the passenger cabin, wherein in said first loop said heat transfer fluid transfers heat from the engine to said plurality of heating coils in the passenger cabin, wherein in said second loop said heat transfer fluid returns to said engine, wherein said third loop is a passenger cooling loop, wherein said plurality of thermo-electric heat pumps receive electrical power to draw heat from the passenger cabin into said third cooling loop, said drawn heat in said third passenger cooling loop being expelled to ambient.

11. A method of controlling a temperature of a passenger cabin in a vehicle having an engine, the method comprising:
   providing a first heating loop;
   circulating a heat transfer fluid from the engine to said first heating loop being in thermal communication with a plurality of heating coils the plurality coils being positioned at a plurality of preselected points complementary to a geometry of a space to be heated in the passenger cabin;
   circulating said heat transfer fluid in said first heating loop in further thermal communication with a plurality of thermo-electric heat pumps for heating the passenger cabin, the plurality of thermo-electric heat pumps being positioned at a plurality of preselected points complementary to the geometry of the space to be heated in the passenger cabin, wherein said heat transfer fluid in said first heating loop returns to the engine; and
   circulating a second heat transfer fluid in a second cooling loop for cooling the passenger cabin;
   wherein said second cooling loop circulates said second heat transfer fluid in thermal communication with said plurality of thermo-electric heat pumps receiving current, and wherein said second cooling loop draws heat from the passenger cabin, said second cooling loop releasing said heat to ambient outside said passenger cabin.

12. The method of claim 11, further comprising detecting a temperature of the passenger cabin and selectively circulating either said heat transfer fluid in said first loop or circulating said second heat transfer fluid said second cooling loop, and further comprising returning said heat transfer fluid to the engine when circulating in said second cooling loop.

* * * * *